United States Patent
Nekoogar et al.

(10) Patent No.: US 8,102,955 B2
(45) Date of Patent: Jan. 24, 2012

(54) MULTI-PULSE FREQUENCY SHIFTED (MPFS) MULTIPLE ACCESS MODULATION FOR ULTRA WIDEBAND

(75) Inventors: Faranak Nekoogar, San Ramon, CA (US); Farid U. Dowla, Castro Valley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 613 days.

(21) Appl. No.: 12/210,827

(22) Filed: Sep. 15, 2008

(65) Prior Publication Data

US 2009/0074119 A1    Mar. 19, 2009

Related U.S. Application Data

(60) Provisional application No. 60/993,764, filed on Sep. 13, 2007.

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ......... 375/346; 327/310; 327/384; 327/551
(58) Field of Classification Search .................. 375/346
See application file for complete search history.

(56) References Cited

U.S. PATENT DOCUMENTS

| | | | |
|---|---|---|---|
| 7,194,019 B2 | 3/2007 | Dowla et al. | |
| 2004/0202230 A1* | 10/2004 | Dowla et al. | 375/147 |
| 2007/0025420 A1* | 2/2007 | Dong | 375/130 |
| 2009/0243934 A1* | 10/2009 | Ameti et al. | 342/465 |

OTHER PUBLICATIONS

Goecket et al., Slightly Frequency-Shifted Reference Ultra-Wideband (UWB) Radio: TR-UWB Without the Delay Element, University of Massachusetts Amherst, 2006.

* cited by examiner

*Primary Examiner* — David C. Payne
*Assistant Examiner* — Erin File

(57) ABSTRACT

The multi-pulse frequency shifted technique uses mutually orthogonal short duration pulses o transmit and receive information in a UWB multiuser communication system. The multiuser system uses the same pulse shape with different frequencies for the reference and data for each user. Different users have a different pulse shape (mutually orthogonal to each other) and different transmit and reference frequencies. At the receiver, the reference pulse is frequency shifted to match the data pulse and a correlation scheme followed by a hard decision block detects the data.

20 Claims, 5 Drawing Sheets

MULTI-PULSE FREQUENCY SHIFTED (MPFS) MULTIPLE ACCESS MODULATION FOR ULTRA WIDEBAND

This application claims priority to U.S. Provisional Patent Application Ser. No. 60/993,764, titled: "Multi-Pulse Frequency Shifted (MPFS) Multiple Access Modulation for UWB", filed Sep. 13, 2007, incorporated herein by reference.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to ultra wideband pulse modulation and detection techniques, and more specifically, it relates to techniques for overcoming multiple access interference in ultra wideband transmissions.

2. Description of Related Art

Multiple access interference (MAI) is a serious problem in UWB communication systems. The use of multiple mutually orthogonal pulses in a multiuser UWB channel can minimize performance degradation due to MAI. Conventionally the multiuser TR receivers use different delays for each user. The one problem with this method is that the same pulse shape for all users generates strong MAI, another major challenge in this technique is delay element implementation for each user which is difficult to incorporate in low power integrated systems.

An example of the use of delay in multiple orthogonal transmitted-reference pulses for UWB channelization is described in U.S. Pat. No. 7,194,019, titled: "Multi-pulse multi-delay (MPMD) multiple access modulation for UWB", incorporated herein by reference. The modulation technique provided in the patent utilizes multiple orthogonal transmitted-reference pulses for UWB channelization. The UWB receiver samples the second order statistical function at both zero and non-zero lags and matches the samples to stored second order statistical functions, thus sampling and matching the shape of second order statistical functions rather than just the shape of the received pulses. While presenting systems and methods that are capable of delivering a large amount of data with a low power spectral density by sampling the ACF of received signals and matching it to the ACF samples of the original pulses for each user and further presenting systems that are more robust and have increased channel capacity to allow a greater number of users to communicate, the required delay for each user presents a significant implementation challenge.

A prior art modulation scheme is known as UWB Slightly Frequency Shifted Transmit Reference (UWB SFS-TR). An example of this technique is described by Qu Zhang in a paper titled: "Slightly Frequency-Shifted Reference Ultra-Wideband Radio", incorporated herein by reference. UWB SFS-TR offers the advantages of the conventional TR technique, including simplicity, reliability of communications in multipath channels, and automatic channel estimation, and avoidance of the complications related to delay element implementation in standard TR receivers. However, UWB SFS-TR does not address the multiuser detection challenge.

SUMMARY OF THE INVENTION

It is an object of the present invention provide a multi-user UWB modulation and detection techniques that avoids the complications related to delay element implementation in standard TR receivers.

These and other objects will be apparent based on the disclosure herein.

The MPFS technique uses mutually orthogonal short duration pulses (e.g., hermite pulses) to transmit and receive information in a UWB multiuser communication system. The multiuser system uses the same pulse shape with different frequencies for the reference and data for each user. Different users have a different pulse shape (mutually orthogonal to each other) and different transmit and reference frequencies. At the receiver, the reference pulse is frequency shifted to match the data pulse and a correlation scheme followed by a hard decision block detects the data.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention is a multi-pulse multi-frequency (MPMF) modulation scheme. Multiple access interference (MAI) is a serious problem in UWB communication systems. The present MPMF modulation scheme addresses the MAI challenge by using the following four conventions: (1) the reference and data pulses are set to have slightly different center frequencies and the same pulse shape; (2) each user uses a different center frequency; (3) the reference and data pulse have a different pulse shape for various users; and (4) each user uses pulses that are mutually orthogonal to the pulses used by all the other users.

For example, per rule 1, a first user can be assigned to use $f_1$ and $f_1-\Delta f_1$ for its data and reference center frequencies respectively, and user "n" will have $f_n$ and $f_n-\Delta f_n$. (Alternately, user 1 can be assigned $f_1$ and $f_1+\Delta f_1$ for its data and reference center frequencies respectively, and user "n" will have $f_n$ and $f_n+\Delta f_n$.)

The use of slightly different center frequencies for reference and data pulses provides some correlation between the pulses which is used for channel estimation without the delay element implementation for each user (as in the conventional TR method). Conventionally the multiuser TR receivers use different delays for each user; however, incorporation of delays in low power integrated systems has proven to be very difficult. The use of mutually orthogonal pulses by each user in the present invention minimizes performance degradation due to MAI.

The present MPFS technique uses mutually orthogonal short duration pulses to transmit and receive information in a UWB multiuser communication system. The multiuser system uses the same pulse shape with different frequencies for the reference and data for each user. Each user uses a different pulse shape (mutually orthogonal to all other users) and different transmit and reference frequencies. Therefore polarity modulated data pulses are always followed by the un-modulated reference pulses which have different center frequencies than the data pulses. Using this method, the channel capacity can increase and more users can share the same spectrum with high BER performance.

Figure 1A:
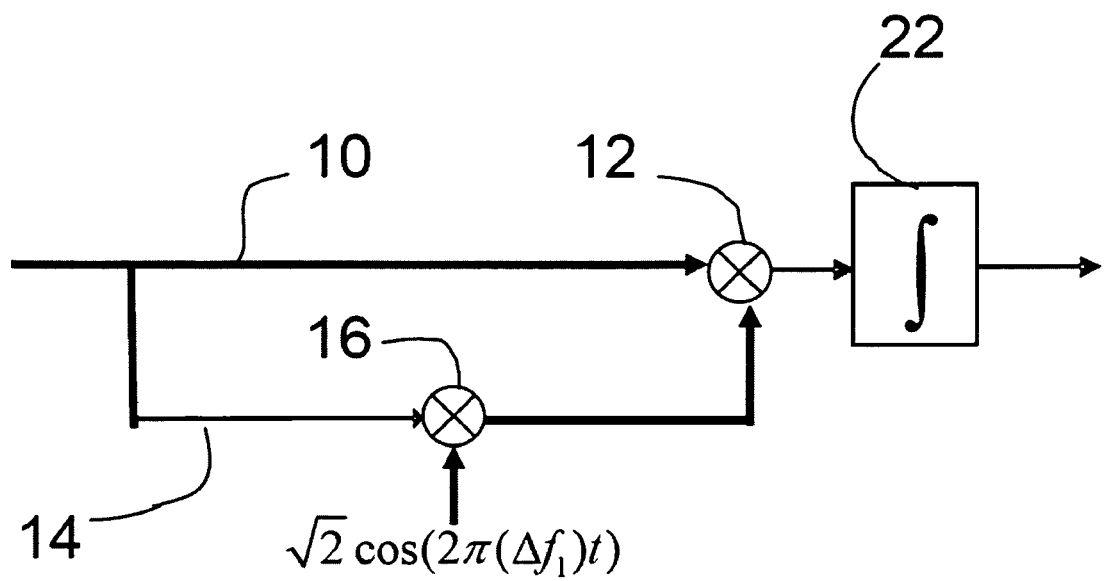
FIG. 1A shows a receiver with an arm 10 connected to a correlator 12.
Figure 1B:
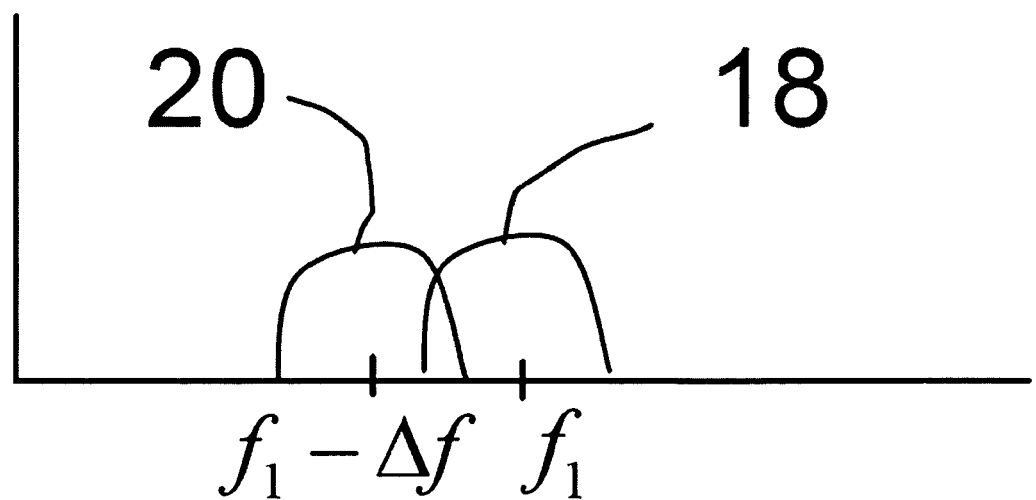
FIG. 1B shows the relative center frequencies of a data pulse 18 and reference pulse 20 for a first user.

To facilitate understanding of the present invention, FIG. 1A shows a receiver with an arm 10 connected to a correlator 12. Arm 14 branches from arm 10 and is connected to a mixer 16 which is then connected to correlator 12. FIG. 1B shows the relative center frequencies of a data pulse 18 and reference pulse 20 for a first user. In this example, the data pulse 18 has a center frequency set at $f_1$ and the reference pulse 20 has a center frequency set at $f_1-\Delta f_1$. Both pulses have the same shape. Mixer 16 is configured to adjust the frequency of the reference pulse, to produce a frequency shifted reference pulse 20', so that when it is combined at correlator 12 with the data pulse 18 that has not traversed arm 14, data pulse 18 and reference pulse 20' will overlap in frequency. Correlator 12 is configured to correlate the same frequency waveforms, and since both data pulse 18 and reference pulse 20' have traversed the same channel and have the same pulse shape, the correlation is high. The output of correlator 12 is integrated at integrator 22. The output of integrator 22 is sent to a bank of matched filters, as discussed below. When a high correlation is observed at correlator 12, the information on the data pulse 18 integrated at integrator 22 is utilized.

Figure 1C:
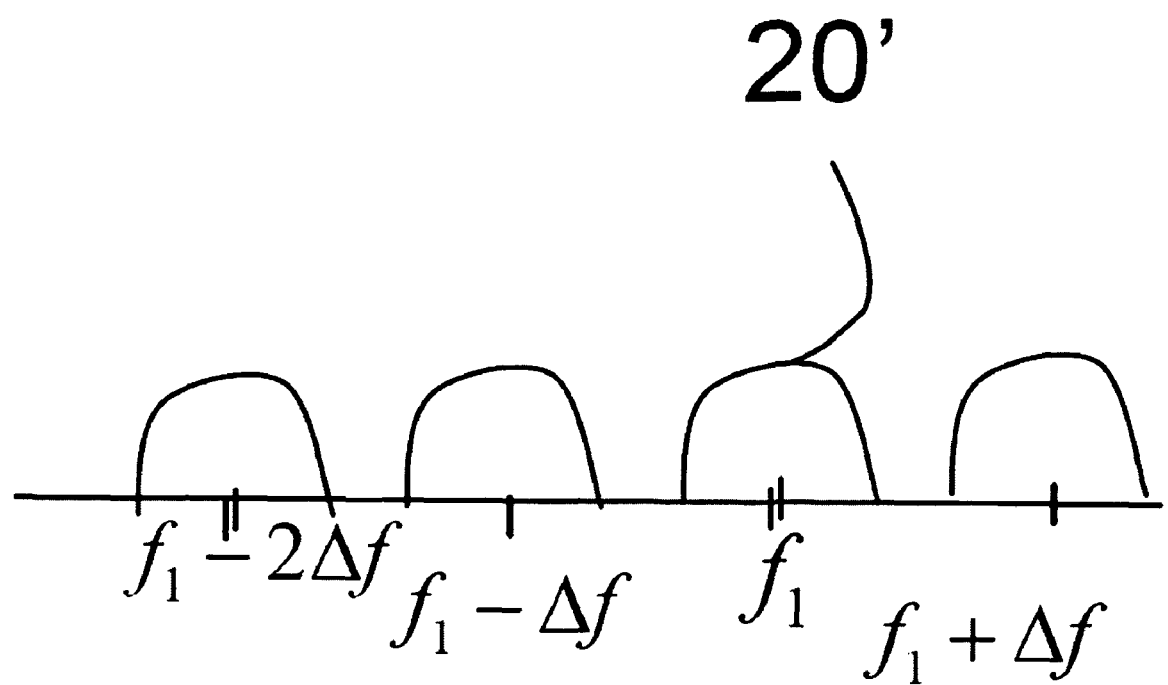
FIG. 1C shows the output of mixer 16 for an input of reference pulse 20 and data pulse 18.

In a specific example, mixer 16 is configured to multiply the signal propagating on arm 14 with the multiplier $\sqrt{2}\cos(2\pi(\Delta f_1)t)$ where $\Delta f_1$ is the frequency shift assigned between the data pulse 18 and reference pulse 20 and t represents time. FIG. 1C shows the output of mixer 16 for an input of reference pulse 20 and data pulse 18. The system produces a reference pulse at a frequency of $f_1-2\Delta f_1$ and also produces reference pulse 20' at $f_1$. The mixer further produces data pulses at $f_1-\Delta_1$ and $f_1+\Delta_1$. The reference pulse at $f_1-2\Delta f_1$ and the data pulse at $f_1-\Delta f_1$ are filtered out in this example. It should be understood by those skilled in the art based on this disclosure that alternate configurations or systems may be used to adjust the reference pulse to overlap the data pulse in frequency, and such are within the scope of the present invention.

Figure 2A:
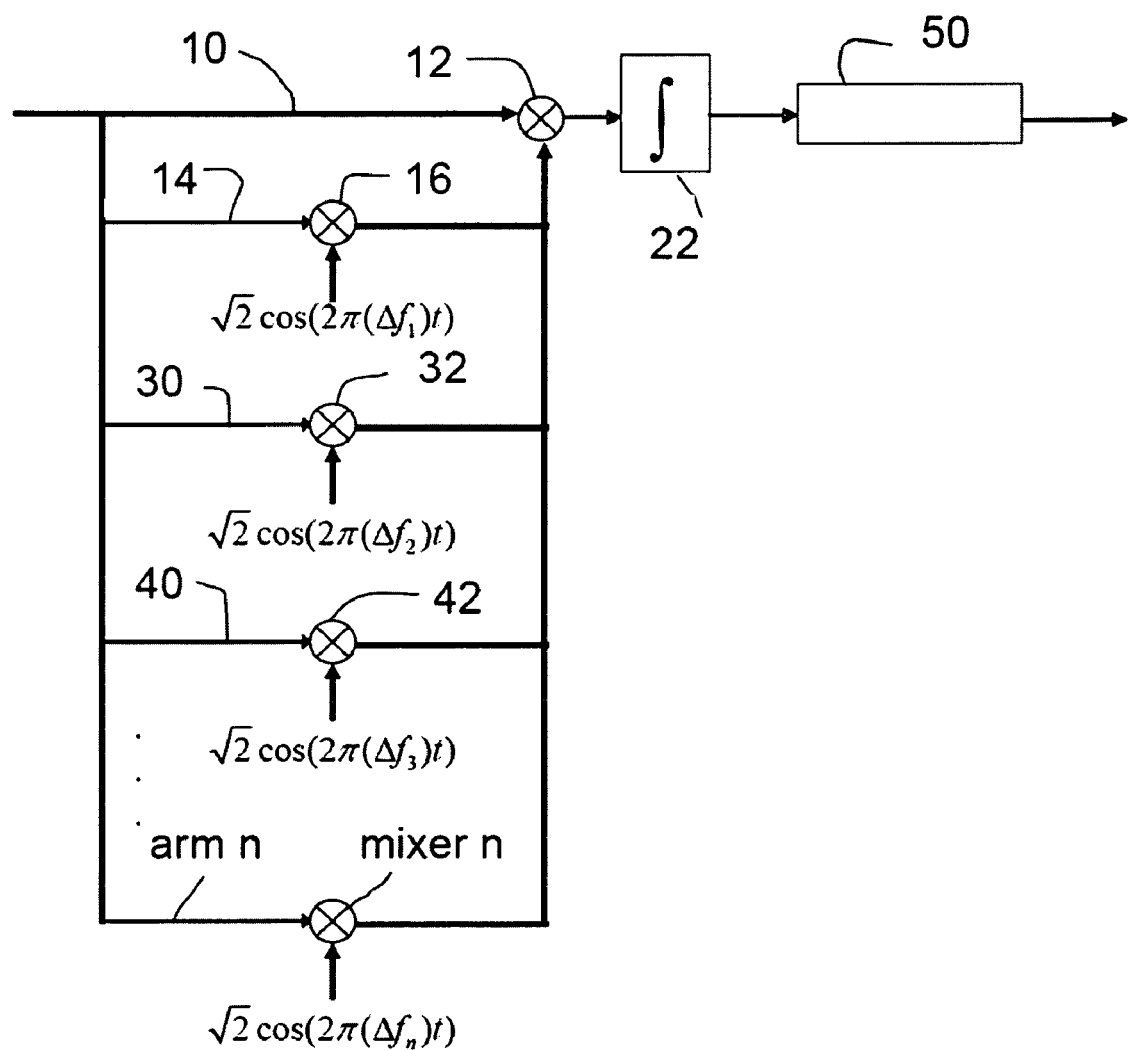
FIG. 2A shows an extension of the receiver of FIG. 1A, including arm 10 connected to correlator 12, and arm 14 branching from arm 10 and connected to mixer 16 which is then connected to correlator 12.
Figure 2B:
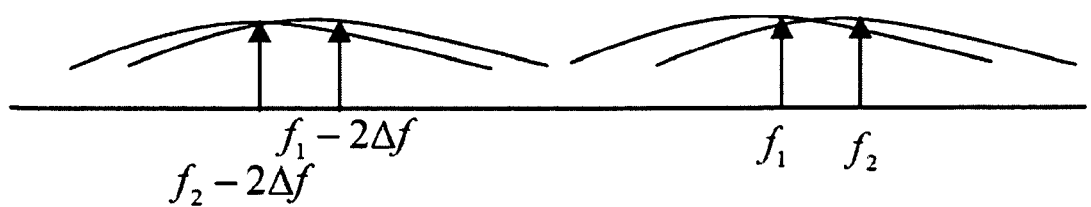
FIG. 2B shows the outputs of mixers 16 and 32.
Figure 2C:
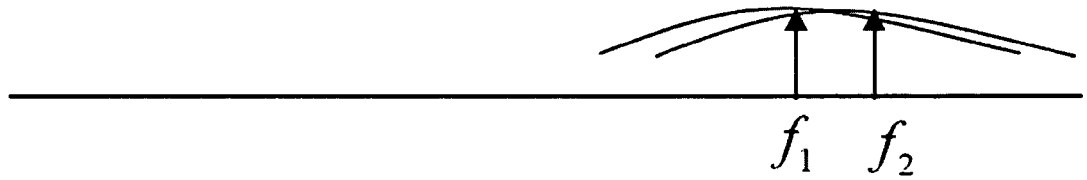
FIG. 2C shows the effect of correlator 12 on the outputs of mixers 16 and 32.
Figure 2D:
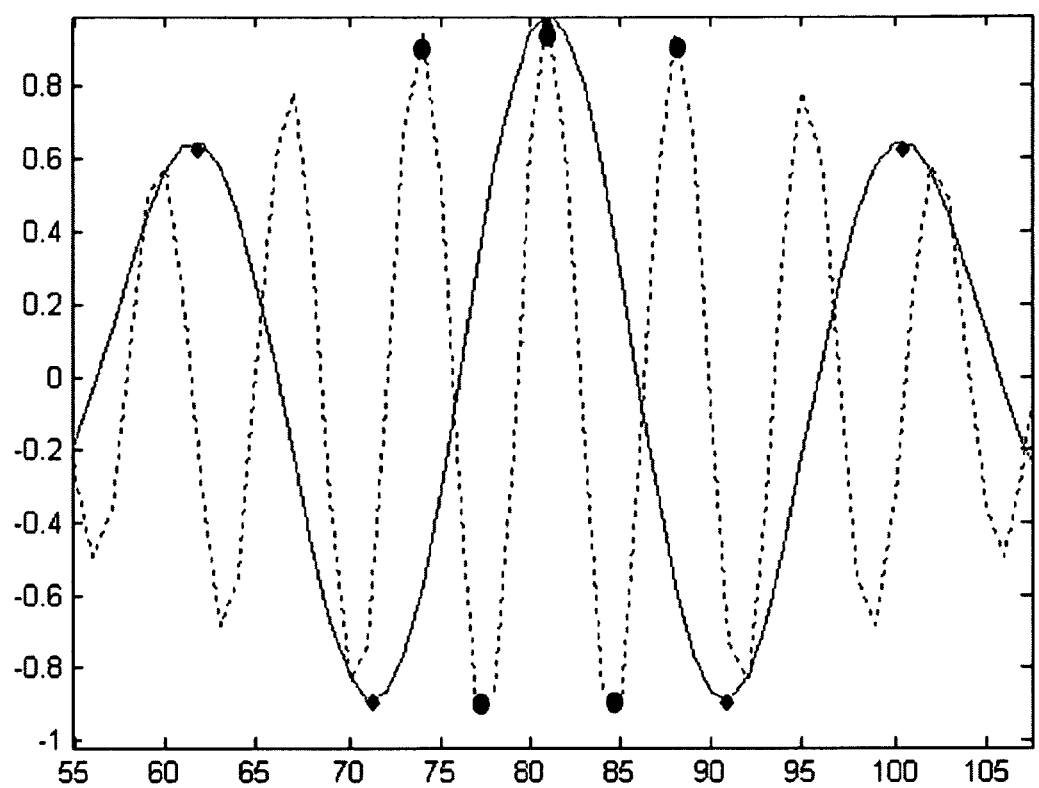
FIG. 2D shows an example of an autocorrelation of orthogonal pulses.

Now that the single user case has been explained, the multi-user case is described. FIG. 2A shows an extension of the receiver of FIG. 1A, including arm 10 connected to correlator 12, and arm 14 branching from arm 10 and connected to mixer 16 which is then connected to correlator 12. The receiver shown in this figure further includes arm 30 with mixer 32, arm 40 with mixer 42 and arm n with mixer n. The mixers 32, 42 and n each apply a respective frequency shift to the signal propagating on their arm such that the particular reference pulse of one user will be shifted in frequency to overlap the frequency of that user's data pulse propagating on arm 10 at correlator 12 to which the output of all mixers 32, 42 and n are connected. Note that the designation of arm n is intended to clarify that the number of users of this system extends to n. This example is a continuation of the example of the single user case discussed in FIGS. 1A-C, such that mixer 32 is configured to multiply the signal propagating on arm 30 with the multiplier $\sqrt{2}\cos(2\pi(\Delta f_2)t)$, mixer 42 is configured to multiply the signal propagating on arm 40 with the multiplier $\sqrt{2}\cos(2\pi(\Delta f_3)t)$ and mixer n is configured to multiply the signal propagating on arm n with the multiplier $\sqrt{2}\cos(2\pi(\Delta f_n)t)$. The outputs of mixers 16 and 32 are shown in FIG. 2B. Correlator 12 acts on the outputs of mixers 16 and 32 to produce the output shown in FIG. 2C. An example of an autocorrelation of orthogonal pulses is shown in FIG. 2D. The orthogonal pulses are transmitted to a bank of matched filters 50 to demodulate the data pulses from each user.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method, comprising:
   receiving ultra wideband pulse pairs, wherein each pulse pair of said pulse pairs is assigned a unique number n associated with a user n and comprises a data pulse ($DP_n$) and a reference pulse ($RP_n$), wherein said $DP_n$ has a data pulse center frequency ($DP_nf_n$) and wherein said $RP_n$ has a reference pulse center frequency ($RP_nf_n$), wherein said $RP_nf_n$ is different from said $DP_nf_n$ by a frequency difference ($\Delta f_n$), wherein within each said pulse pair, said $DP_n$ and said $RP_n$ comprise a substantially identical pulse shape, and wherein said pulse shape of each said pulse pair is different from that of all other pulse pairs; and
   altering said $RP_nf_n$ of each said $RP_n$ to produce an altered frequency reference pulse ($AFRP_n$) having a center frequency about equal to said $DP_nf_n$.

2. The method of claim 1, further comprising correlating each said $DP_n$ with its respective said $AFRP_n$ to produce a correlated signal ($CS_n$).

3. The method of claim 2, further comprising integrating said $CS_n$ to produce an integrated signal ($IS_n$).

4. The method of claim 3, further comprising matching said $IS_n$ to a template to produce a matched signal $MS_n$.

5. The method of claim 4, further comprising demodulating said $MS_n$.

6. The method of claim 1, wherein prior to the step of receiving ultra wideband pulse pairs, said method further comprises transmitting said pulse pairs.

7. The method of claim 1, wherein each said pulse pair comprises a pulse shape that is mutually orthogonal to that of all other pulse pairs.

8. The method of claim 7, wherein each said pulse pair comprises a hermite pulse shape.

9. The method of claim 1, wherein each said $\Delta f_n$ for each said reference pulse ($RP_n$) is about the same as all other said $\Delta f_n$.

10. The method of claim 1, wherein each said $\Delta f_n$ for each said reference pulse ($RP_n$) is different from all other said $\Delta f_n$.

11. The method of claim 1, wherein each said $\Delta f_n$ for each said reference pulse ($RP_n$) is positive.

12. The method of claim 1, wherein each said $\Delta f_n$ for each said reference pulse ($RP_n$) is negative.

13. The method of claim 1, wherein the step of altering said $RP_nf_n$ of each said $RP_n$ comprises multiplying each said $RP_nf_n$ by a multiplier.

14. The method of claim 13, wherein said multiplier comprises $\sqrt{2}\cos(2\pi(\Delta f_n)t)$, where t represents time.

15. A method, comprising:
   transmitting a plurality of ultra wideband pulse pairs, each pulse pair associated with a different user, wherein each pulse pair of said pulse pairs comprises a data pulse and a reference pulse, wherein each said data pulse has a data pulse center frequency and wherein each said reference pulse has a reference pulse center frequency, wherein within each said pulse pair, each said reference pulse center frequency is different from said data pulse center frequency by a frequency difference, wherein within each said pulse pair, said data pulse and said reference pulse comprise a substantially identical pulse shape, and wherein each said pulse pair comprises a different pulse shape from the other pulse pairs;

receiving said plurality of ultra wideband pulse pairs; and within each pulse pair, altering said reference pulse center frequency, to produce an altered frequency reference pulse that has about the same center frequency as said data pulse center frequency within said pulse pair.

16. The method of claim 15, further comprising correlating each said data pulse with its respective said altered frequency reference pulse to produce a correlated signal.

17. The method of claim 16, further comprising:
integrating said correlated signal to produce an integrated signal; and
matching said integrated signal to a template to produce a matched signal.

18. The method of claim 17, further comprising demodulating said matched signal.

19. The method of claim 15, wherein each said pulse pair comprises a pulse shape that is mutually orthogonal to that of all other pulse pairs.

20. An apparatus, comprising:
an ultra wideband transmitter configured for transmitting a plurality of ultra wideband pulse pairs, each pulse pair associated with a different user, wherein each pulse pair of said pulse pairs comprises a data pulse and a reference pulse, wherein each said data pulse has a data pulse center frequency and wherein each said reference pulse has a reference pulse center frequency, wherein within each said pulse pair, each said reference pulse center frequency is different from said data pulse center frequency by a frequency difference, wherein within each said pulse pair, said data pulse and said reference pulse comprise a substantially identical pulse shape, and wherein each said pulse pair comprises a different pulse shape from the other pulse pairs;

an ultra wideband receiver configured for receiving said plurality of ultra wideband pulse pairs; and means for altering said reference pulse center frequency within each pulse pair to produce an altered frequency reference pulse that has about the same center frequency as said data pulse center frequency within said pulse pair.

* * * * *